United States Patent [19]

Gardner

[11] 4,207,084

[45] Jun. 10, 1980

[54] SINGLE BED SEPARATOR APPARATUS

[75] Inventor: Paul J. Gardner, Davenport, Iowa

[73] Assignee: The Bendix Corporation, Southfield, Mich.

[21] Appl. No.: 934,748

[22] Filed: Aug. 21, 1978

Related U.S. Application Data

[63] Continuation of Ser. No. 784,299, Apr. 4, 1977, abandoned.

[51] Int. Cl.² .............................................. B01D 53/06
[52] U.S. Cl. ........................................ 55/181; 55/189; 55/390
[58] Field of Search ................... 55/25, 26, 33, 58, 62, 55/74, 75, 78, 162, 163, 179–181, 189, 387, 389, 390

[56] References Cited

U.S. PATENT DOCUMENTS

| | | | |
|---|---|---|---|
| 2,586,670 | 2/1952 | Lambertsen | 55/387 |
| 3,121,625 | 2/1964 | Broughton | 55/58 |
| 3,164,454 | 1/1965 | Wilson | 55/58 X |
| 3,225,518 | 12/1965 | Skarstrom et al. | 55/33 |
| 3,236,028 | 2/1966 | Rutan | 55/33 |
| 3,237,377 | 3/1966 | Skarstrom | 55/25 |
| 3,266,869 | 8/1966 | Dengler | 55/58 X |
| 3,338,032 | 8/1967 | Siewert | 55/162 |
| 3,399,510 | 9/1968 | Kauer, Jr. et al. | 55/33 |
| 3,477,210 | 11/1969 | Hervert | 55/387 |
| 3,555,787 | 1/1971 | Lustig | 55/179 |
| 3,572,008 | 3/1971 | Hankison et al. | 55/33 |
| 3,891,411 | 6/1975 | Meyer | 55/26 |
| 3,898,047 | 8/1975 | Cramer | 55/25 X |

*Primary Examiner*—Robert H. Spitzer
*Attorney, Agent, or Firm*—Leo H. McCormick, Jr.; Ken C. Decker

[57] ABSTRACT

An apparatus for separating a product effluent from a fluid mixture through the retention of a component, or components, in a bed of adsorption particles. The apparatus has a housing with a chamber therein for retaining the bed of adsorption particles. A first port in the housing connects the chamber with a source of the fluid mixture. The bed of adsorption particles is connected to a second port in the housing through a header chamber. The second port is connected to a product effluent responsive device. A third port in the housing connects the chamber to a discharge conduit. A first valve controls the communication of the fluid mixture into the chamber and a second valve inhibits the communication of any resultant product effluent through the second port until a specific fluid pressure develops in the chamber whereby the bed of adsorption particles readily adsorbs a component, or components, in the fluid mixture. After this specific fluid pressure is achieved, a fixed volume of the fluid mixture is communicated to the bed of adsorption particles where the component, or components, are retained and a resultant product effluent flows into the header chamber for distribution through the second port. Upon completion of the communication of the fixed volume of fluid mixture to the bed of adsorption particles, the first valve prevents further fluid mixture communication to the bed of adsorption particles. Thereafter, the product effluent stored in the header chamber flows into the bed of adsorption particles and purges the component, or components, therefrom by flowing through the third port to the discharge conduit.

34 Claims, 16 Drawing Figures

SINGLE BED SEPARATOR APPARATUS

This is a continuation, of application Ser. No. 784,299, filed Apr. 4, 1977, now abandoned.

BACKGROUND OF THE INVENTION

This invention relates to an apparatus for the separation of a product effluent from a fluid mixture through sequential adsorption and desorption in a single bed of adsorption particles.

Any component in a fluid mixture having adsorbate/adsorbent isotherms different from the other components in the fluid mixture can be separated from the fluid mixture, the component being attracted into the pores or onto rough surfaces of the adsorption particles. The physical adsorption of the component in the pores increases with increasing pressure and/or decreasing temperature and is reversed by lowering the pressure and/or increasing the temperature. Since adsorption is exothermic and desorption is endothermic the most efficient separation occurs if the thermal energy in the system is conserved and balanced between the two steps. However, because of the energy required to provide a thermal contribution to the separation process currently available, fluid separation such as disclosed in U.S. Pat. No. 2,944,627 only employs the use of pressure in the separation process.

The separator disclosed in U.S. Pat. No. 2,944,627 employs two beds of adsorption particles which are alternately connected to a source of fluid mixture under pressure. Adsorption takes place in one bed at an elevated pressure while the other bed is desorbed at a lower pressure. By alternating the operation of the beds, a continuous flow of product effluent is produced. However, in purging the component from the bed of adsorption particles on desorption, it is necessary to utilize up to 75 percent of the product effluent produced by the bed of adsorption particles on adsorption to effectively regenerate a bed saturated with the component. The reasons for such ineffiency are that the exothermic heat of adsorptin is displaced and not readily available to desorption; and desorption flow paths are long and highly restrictive at the desired operational pressures.

Therefore, before such fluid mixture separations are acceptable for many processes of industry, the overall efficiency thereof needs to be improved. Such an improved fluid mixture separator would be beneficial in the separation of oxygen from air to improve biological, physiological, chemical and combustion processes which use oxygen. For instance, hydrocarbon fuel use is relatively inefficient due to the incompleteness of fuel oxidation (burning) and the thermal/thermodynamic management of the burning process. It has been determined that the actual energy output of natural gas or fuel oil in heating systems or gasoline in internal combustion engines could be increased 30% or more by burning the fuels with air that is oxygen enriched.

SUMMARY OF THE INVENTION

Through experimentation it has been determined that the overall efficiency of pressure swing, adsorption-desorption fluid separators would improve with better fluid dynamics and thermal energy conservation. Fluid dynamics of the separator apparatus would improve if the length of the bed of adsorption particles and fluid flow path were selected such that with a single gas exposure pass, all the separatable molecules in the fluid mixture would have adequate exposure to an adsorption surface. Whereas, the thermal management of the system would be improved if the exothermic heat of adsorption were retained within the local bed regions of adsorption particles to readily provide the endothermic heat for desorption.

I have devised a separator apparatus which conserves exothermic heat during adsorption to provide endothermic heat which enhances desorption and thereby maintains the local substantially thermal equilibrium within a bed region of adsorption particles. The separator apparatus has a housing with a bore therein. The bore has a first port connected to a source of fluid mixture, a second port connected to a product effluent responsive device and a third port connected to a discharge conduit. A piston is located in the bore and establishes a pressurizing chamber adjacent the first port and an expansion chamber adjacent the third port. The piston has a chamber therein for retaining a bed of adsorption particles. A groove located on the periphery of the piston cooperates with the housing to establish a header chamber. The piston has a control chamber which connects the bed of adsorption particles and the pressurizing and expansion chambers. A first valve controls the flow of the fluid mixture through the first port. A second valve controls the flow of product effluent through the second port. A third valve controls the flow of the product effluent and a component through the third port. A shaft connected to a motor is attached to the piston. The shaft supplies the piston with reciprirocal motion to establish a first and second mode in an operational cycle for the separator apparatus.

During the first mode of the operational cycle, the piston moves toward the pressurizing chamber to compress the fluid mixture therein. The compressed fluid mixture is communicated to the bed of adsorption particles through the control chamber. The second valve prevents and delays the product effluent from being communicated from the header chamber through the second port unitl a saturation or active adsorption fluid pressure level is developed in the bed of adsorption particles. At the same time the piston compresses the fluid mixture in the pressurizing chamber, the residual product effluent and component in the expansion chamber is expanded to reduce the fluid pressure therein.

At the top of the piston stroke the direction of the piston is reversed and the second mode of the operational cycle initiated. Upon initiation of the second mode, the fluid mixture communication between the bed and the pressurizing chamber is interrupted. Thereafter, the bed of adsorption particles is connected to the low pressure of the expansion chamber through the control chamber. The product effluent in the header chamber flows through the bed of adsorption particles and desorbs or purges the component retained thereon. The product effluent and component flows to the expansion chamber until the fluid pressure in the header chamber, bed of adsorption particles, and expansion chamber are equal. Thereafter, the third valve opens and allows the product effluent and component to flow into the discharge conduit.

As the piston moves during the second mode, the first valve means opens and allows a fixed volume of fluid mixture to flow into the pressurizing chamber for distribution to the bed of adsorption particles in the next "first mode" cycle of operation.

Thus, the thermal energy created by the piston in compressing the fluid mixture complements the heat of adsorption in the bed of adsorption particles to maintain the separator apparatus at a substantial thermal equilibrium between the adsorption and desorption cycles of operation.

It is the object of this invention to provide a separator apparatus with a means to conserve and balance the thermal energy generated in a single bed of adsorption particles during adsorption of a component from a fluid mixture with the thermal energy lost during desorption of the component from the single bed of adsorption particles by low pressure expansion discharge therefrom.

It is another object of this invention to provide a fluid separator apparatus with a piston having a chamber therein for retaining a bed of adsorption particles. The piston when moved in a first mode of operation pressurizes a fixed volume of fluid mixture in a pressurizing chamber and evacuates an expansion chamber. This pressurized fluid mixture is communicated to the bed of adsorption particles where a component is adsorbed and a product effluent is communicated to a distribution conduit. When the piston moves in a second mode of operation, the pressurizing of the fluid mixture terminates and the product effluent flows to the expansion chamber to purge the component from the bed of adsorption particles. The product effluent flows into the expansion chamber until the pressure in the beds of adsorption particles and the expansion chamber is equal. Thereafter, the piston pushes the product effluent and component through a discharge port to cleanse the expansion chamber. At the same time the piston draws a fixed volume of the fluid mixture into the pressurizing chamber for separation in the bed of adsorption particles when the direction of the piston is reversed to initiate another operational cycle in the separator apparatus.

It is a further object of this invention to provide a single bed of adsorption particles with means to delay the transmission of a product effluent from the single bed until a saturation or active adsorption fluid pressure level is achieved therein.

It is a further object of this invention to provide a fluid separator with a motor for providing a piston retaining a bed of adsorption particles with reciprocal motion to create an adsorption mode and a desorption mode therein for separating a product effluent from a fluid mixture.

It is another object of this invention to provide a fluid separator apparatus having a single bed of adsorption particles with an outlet flow restrictor to control the fluid pressure rise in the single bed and the flow of a product effluent into a header chamber during the pressurization part of the operational cycle and the flow of the product effluent through the single bed during the purge part of the operational cycle.

It is a still further object of this invention to provide an adsorption/desorption fluid separator with a means to vary the time periods that a single bed of adsorption particles are operating in the adsorption and desorption mode.

It is a further object of this invention to provide a fluid separator apparatus having a single bed of adsorption particles with a means to restrict and delay the flow of product effluent through the bed until an active adsorption pressure level is reached before a product flow response device allows a product effluent to flow therefrom.

It is a further object of this invention to provide a fluid separator apparatus having multiple beds of adsorption particles with a means to restrict and delay the flow of a product effluent through each of the multiple beds until an active adsorption pressure level is achieved before a product flow response device allows a controlled product effluent to flow therefrom.

It is a further object of this invention to provide a fluid separator apparatus having a single bed of adsorption particles with a means to restrict the flow of product effluent through the bed to minimize the dislocation and discharge of heat generated within the single bed during adsorption of a component from a fluid mixture.

It is a further object of this invention to provide a fluid separator apparatus having a single bed of adsorption particles with a means to restrict and delay the flow of product effluent through the bed until an active adsprotion pressure level is reached to assure adequate exposure time for adsorption of a separable component from a fluid mixture.

It is a further object of this invention to provide a fluid separator apparatus having a single bed of adsorption particles with a means to restrict and delay the flow of product effluent through the bed resulting in heat retention during adsorption and faster adsorbate response time during low pressure desorption.

It is a further object of this invention to provide a fluid separator apparatus having a single bed of adsorption particles with a means to restrict the flow of product effluent through the bed to establish an adsorbate/adsorbent volume ratio for a given adsorption to desorption delta pressure and temperature condition associated with an input fluid mixture and output product effluent.

These and other objects will be apparent from reading this application and viewing the drawings.

DETAILED DESCRIPTION OF THE INVENTION

Figures 1, 2:
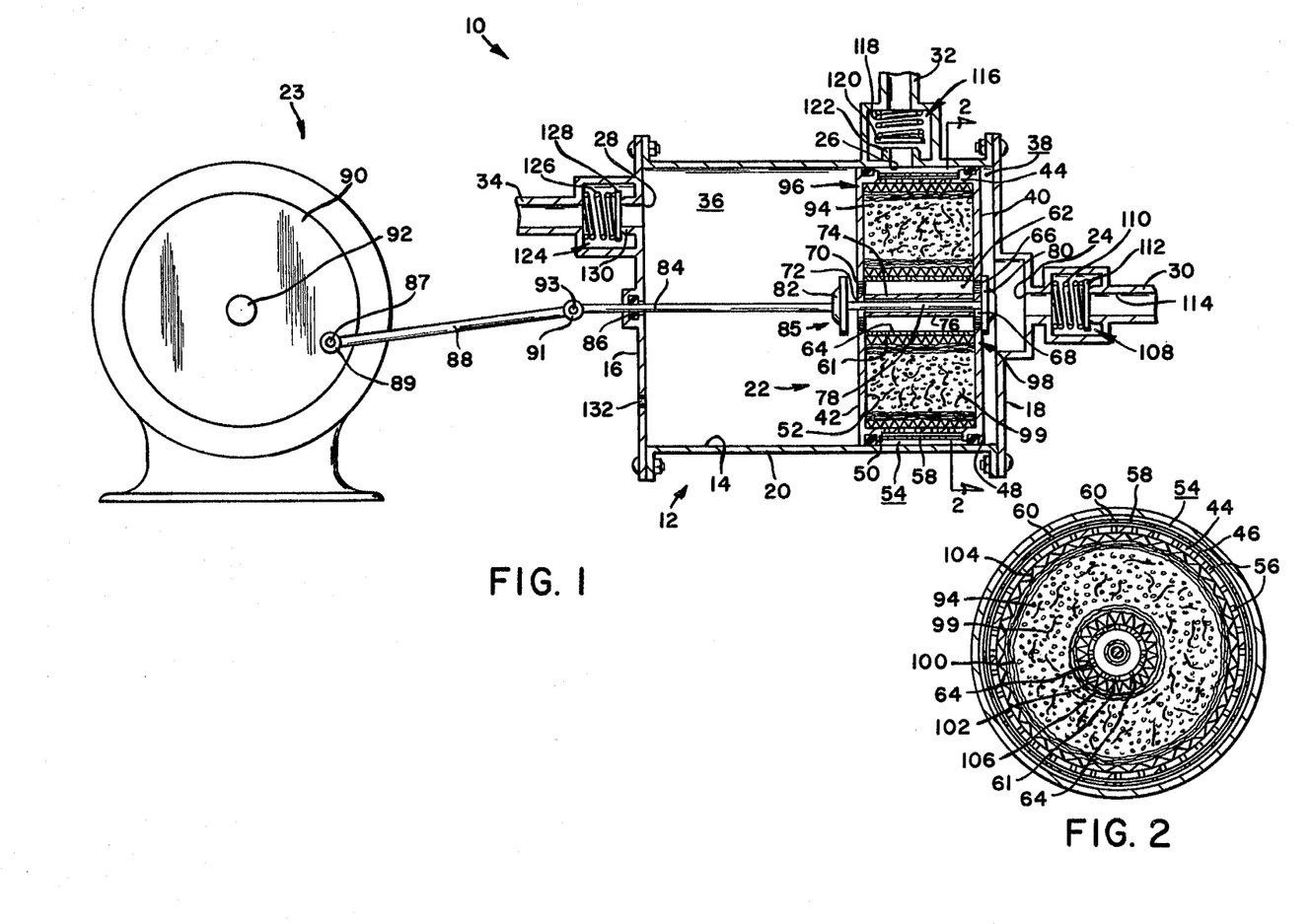
FIG. 1 is a sectional view of an adsorption/desorption separator apparatus made according to the principles of the invention disclosed herein.
FIG. 2 is a sectional view taken along line 2—2 of FIG. 1.

The separator apparatus 10 illustrated in FIG. 1 is adapted to separate either nitrogen or oxygen from air depending on the ultimate use of the resultant product effluent. The separator apparatus 10 can be used to separate a component from a fluid mixture to produce a product effluent whenever a component in the fluid mixture is attracted to an adsorption particle in a pressurization increase cycle and extracted from the adsorption particle during a purge and pressure decrease cycle.

The separator apparatus 10 shown in FIG. 1 includes a housing 12 formed by attaching end plates 16 and 18 to a cylindrical body 20 and a motor member 23.

The cylindrical body 20 has a bore 14 located therein. The housing has a first port 24, a second port 26 and a third port 28 for connecting the bore 14 with a source of fluid mixture through conduit 30, a product effluent responsive member through conduit 32, and a discharge conduit 34.

A piston member 22 is located in bore 14 to establish an expansion chamber 36 adjacent port 28 and a pressurization chamber 38 adjacent port 24. The piston member has a first wall 40 separated from a second wall 42 by a cylindrical member 44 to establish a retention chamber 52 therein. The cylindrical member 44 has a groove 46 (see FIG. 2) located between lands 48 and 50 and with the housing 20 establishes a header chamber 54 in bore 14. The cylindrical member 44 has a series of radial openings 56 located therein for connecting the retention chamber 52 with the header chamber 54. A restrictive sleeve 58 having a radial opening 60 of a different size and at a different interval than radial openings 56, is attached to the cylindrical member 44 to further limit the communication from the retention chamber 52 into the header chamber 54.

A tube 60 is located along the axial center of the first and second walls 40 and 42 to establish a control chamber 62. Tube 60 has a series of openings 64 for connecting the retention chamber 52 with the control chamber 36. The first wall 40 has a series of openings 66 surrounding an axial opening 68 for connecting the pressurizing chamber 40 with the control chamber 62. The second wall 42 has a series of openings 70 surrounding an axial opening 72 for connecting the expansion chamber 36 with the control chamber 62. Guides 74 and 76 are connected to the first and second walls 40 and 42 to provide a bearing surface for stem 78. Stem 78 connects a first face member 80 with a second face member 82 on a control valve 85. The control valve 85 regulates the communication of fluid mixture and product effluent-component fluid mixture through the control chamber 62. Second valve face member 82 of the control valve 85 is attached to push rod 84 which extends through a bearing seal arrangement 86 in end plate 16.

A pivotal linkage 88 connects push rod 84 with a flywheel 90 located on shaft 92 of the motor member 23. The shaft 92 of the motor member 23 upon rotation provides piston 22 with reciprocal motion.

Depending on the product effluent desired, the retention chamber 52 is filled with adsorption particles 94 such as a zeolite. It is well known in the separator arts such as described in U.S. Pat. No. 3,880,616 that when oxygen is the desired product effluent, a zeolite having a pore size of approximately 4.8 Angstroms is selected for the adsorption material.

In order to assure that the adsorption particles 94 remain in the retention chamber 52, filter systems 96 and 98 are located between the cylindrical member 44 and tube 60, respectively.

As best illustrated in FIG. 2, filter systems 96 and 98 have fibrous mat or coarse felt filters 100 and 102 located adjacent the adsorption particles, and a paper, screen or foam filters 104 and 106 located adjacent the cylindrical members 44 and tube 60, respectively.

In addition, plastic fibers 99 may be interspersed throughout the bed of adsorption particles to loosely hold the individual particles in a substantially fixed position. The plastic fibers 99 absorb the shock forces caused by the pressurized fluid mixture and product effluent acting on the particles to reduce rubbing and thereby minimize powdering of particles in the bed.

The communication of fluid mixture into the separator 10 is controlled by a first valve 108 which is attached to end plate 18. The first valve 108 which surrounds port 24 has a spring 110 which acts on and urges face 112 toward a seat 114 to only permit the fluid mixture to flow in one direction from conduit 30 into the pressurizing chamber 38.

A second valve 116 attached to the cylindrical member 20 and surrounding port 26 has a spring 118 which acts on and urges face 120 toward seat 122 to prevent the flow of the product effluent through the second port 26 whenever the fluid pressure in the bore is below a predetermined active adsorption or saturation level.

A third valve 124 attached to end plate 16 and surrounding port 28 has a spring 126 which urges face 128 against a seat 130 to prevent the communication from the conduit 34 into the expansion chamber whenever the fluid pressure in the expansion chamber is below that in the discharge conduit.

The end plate 16 has an orifice 132 therein with a size and/or adjustment such that a resulting low pressure can be produced in the expansion chamber 36 to establish a pressure differential for flowing a product effluent from the header chamber 54. The flowing produce effluent purges a component into the expansion chamber 36 during the desorption part of the operational cycle to cleanse the bed of adsorbed gases therefrom.

MODE OF OPERATION OF THE INVENTION

The separator apparatus 10 shown in FIG. 1 is shown in a condition whereby an oxygen enriched product effluent is produced from the surrounding environment.

The motor member 23 supplies shaft 92 with a rotational torque which rotates flywheel 90. As flywheel 90 rotates end 89 of linkage member 88 pivots on pin 87 and moves in an arcuate path, however, end 91 pivots on pin 93 and provides push rod 84 with a linear input force which moves piston member 22 back and forth in bore 14.

As shown in FIG. 1, linkage 88 acting through push rod 84 has moved end face 80 against the wall 40 to prevent communication through openings 66 from the pressurizing chamber 38 into the control chamber 62. With openings 66 closed communication of pressurized fluid mixture to the bed of adsorption particles 52 is interrupted and the distribution of the product effluent from conduit 32 is terminated. The fluid pressure in the bed of adsorption particles at this time is in an operational cycle as illustrated by point 140 on line 142 in FIG. 14. Valve 108 remains closed until the fluid pressure in the pressurizing chamber 38 is less than the fluid pressure in the fluid mixture in conduit 30. Thereafter, further movement of the piston member 22 draws a fixed volume of the fluid mixture into the pressurizing chamber 38 by overcoming spring 110 to unseat face 112 from seat 114.

Figure 14:
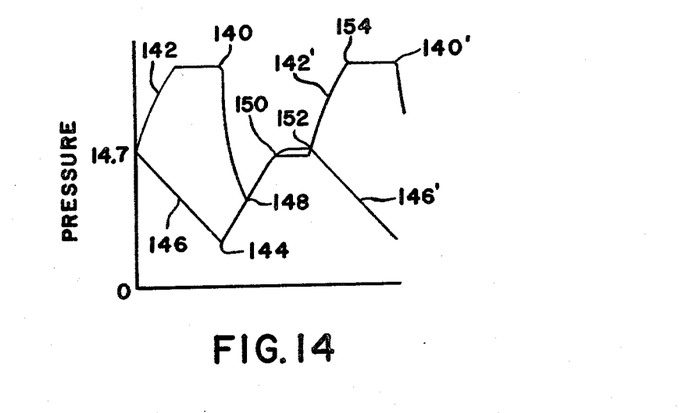
FIG. 14 is a graph illustrating the fluid pressure characteristics in the pressurizing chamber and expansion chamber of the separator apparatus in FIG. 1.

Prior to the closing of communication from the pressurizing chamber 38 to the control chamber 62, the fluid pressure in the expansion chamber 36 reaches a level indicated by point 144 on line 146.

Immediately following the closure of the communication into the control chamber 62 through passages or openings 66, push rod 84 moves the second face member 82 away from openings 70 as shown in FIG. 1 to initiate communication from the control chamber 62 into the expansion chamber 36.

The fluid mixture in the control chamber 62 initially flows into the evacuated space in the expansion chamber.

Thereafter, the product effluent in the header chamber 54 reverses its flow direction and flows through openings 60 in the restrictor plate 58 and openings 56 in the cylindrical wall or member 44 into the bed of adsorption particles. The fluid pressure in the bed of adsorption particles by this time is below the saturation or active pressure level and the component part of the fluid mixture (nitrogen where air is the fluid mixture) is released from the surface adsorption bond and transmitted by free flow and the product effluent to the control chamber 62 for distribution to expansion chamber 36.

Figure 3:
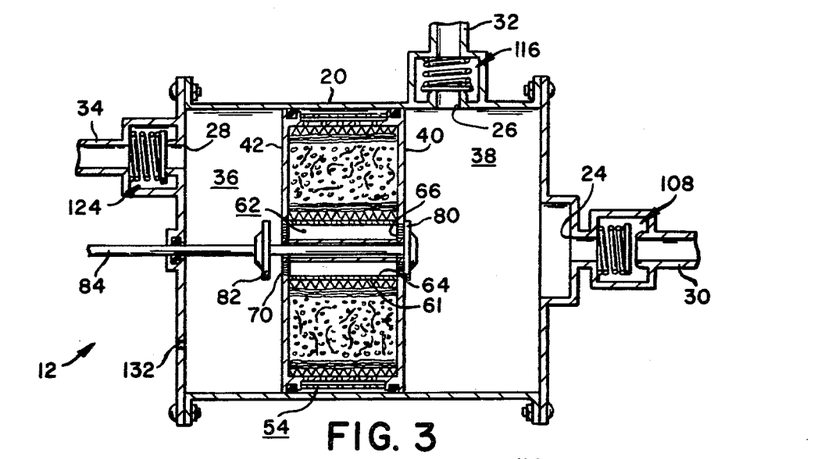
FIG. 3 is a sectional view of the separator apparatus illustrated in FIG. 1 showing the purge mode of operation.

The product effluent continues to flow and transmit the component into the expansion chamber 36 until an equilibrium pressure illustrated by point 148 on line 146 in FIG. 14 occurs. Thereafter, the fluid pressure in the expansion chamber increases and at a point 150 shown in FIG. 14 is equal to the fluid pressure in the discharge conduit 34, at this time piston 22 assumes a location shown in FIG. 3. Piston 22 continues to move in bore 14 toward the expansion chamber and creates a pressurizing force sufficient to overcome spring 126 and expel the product effluent and component from the expansion chamber 36 into the discharge conduit 34.

Figure 4:
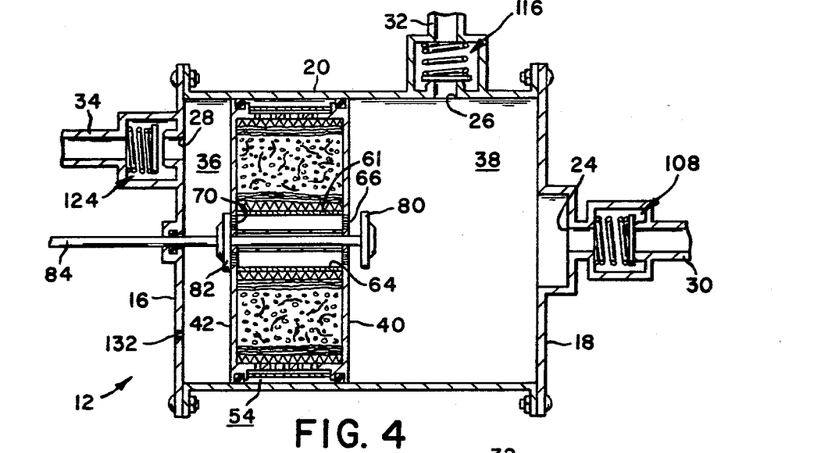
FIG. 4 is a sectional view of the separator apparatus illustrated in FIG. 1 showing a pressurizing mode of operation.
Figure 5:
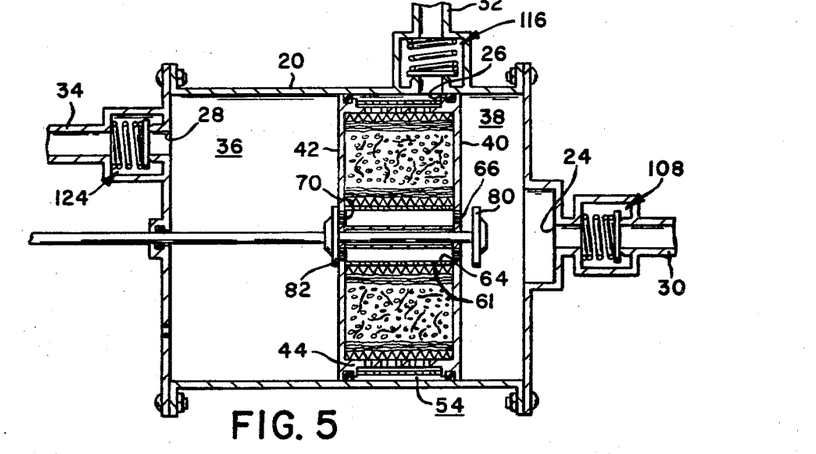
FIG. 5 is a sectional view of the separator apparatus illustrated in FIG. 1 showing a product effluent mode of operation.

At the top of the stroke of the piston member 22, illustrated in FIG. 4, push rod 84 moves the second valve face 82 against wall 42 to interrupt communication from the control chamber 62 to the expansion chamber 36. At this time the fluid pressure in the bed of adsorption particles 52, control chamber 62, and header chamber 54 is equal to point 152 in FIG. 14.

Push rod 84 acts on wall 42 to move the piston member 22 toward the pressurizing chamber 38 to pressurize the fixed volume of fluid mixture (air) therein. The fluid pressure built up in the pressurizing chamber 38 and bed of adsorption particles follows line 142, in FIG. 14. When wall 40 of the header chamber 54 moves past port 26, the header chamber 54 is then brought into communication with the second port 26. During this fluid pressure build up, the fluid mixture is communicated through openings 66 into the control chamber 62 for distribution to the bed of adsorption particles in retention chamber 52.

The spring 118 in the second valve 116 is selected to allow communication of the product effluent in the header chamber 54 to flow past seat 122 when the saturation or active adsorption pressure level, illustrated by point 154 in FIG. 14 is achieved in the bed of adsorption particles 52.

Thereafter, the piston member 22 continues to move toward the pressurization chamber 38. However, the fluid pressure level therein remains constant. The thermal energy generated in compressing the fluid mixture in the pressurizing chamber continues and is transmitted with the pressurized fluid mixture to the bed of adsorption particles in retention chamber 52 to subsequently aid in the desorption of the component therein.

Upon closure of the communication between the control chamber 62 and the expansion chamber 36, valve 124 interrupts the flow through port 28. As piston member 22 moves toward the pressurizing chamber, the residual product effluent and component therein is expanded and a pressure level illustrated by line 146', illustrated in FIG. 14 created.

At the bottom of the stroke of the piston member 22, push rod 84 again moves the first face member 80 against wall 40 and open control valve 85 to allow the product effluent in the header chamber 54 to purge the component from the single bed of adsorption particles to the control chamber 62 for distribution to the expansion chamber 36.

This cyclic operation continues as long as the motor member 23 provides the piston member 22 with reciprocating motion. Under some conditions it may be desirable to connect a plurality of piston members 22 to the flywheel 90 since the motor 23, as illustrated in FIG. 1, is only operating at approximately 50% of its effective power producing efficiency. Such a scheme could be used to provide a continuous product effluent flow from conduit 32.

In the embodiments of the separator apparatus disclosed in the remaining figures in the sheets of drawings, like elements are identified by the same numerals as in FIG. 1.

Figure 6:
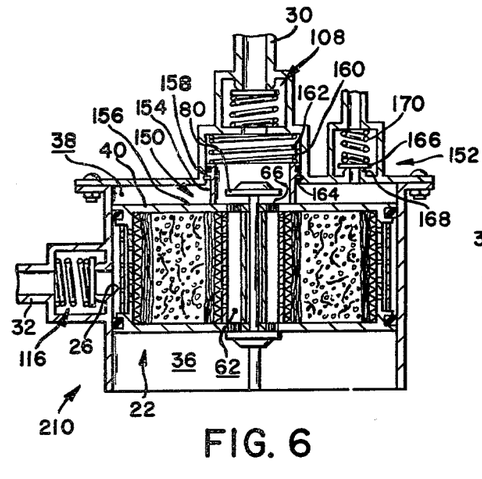
FIG. 6 is a sectional view of the separator apparatus illustrated in FIG. 1 showing a means for varying the adsorption time period of a single bed of adsorption particles with respect to the desorption time period in an operational cycle.

In FIG. 6 the housing 22 of separator apparatus 210 has included therein an operational limiter valve 150 and a relief valve 152. It has been found through experimentation that the time involved for an adsorbent particle in the bed of adsorption particles to adsorb a component onto its surface takes less time than to desorb the component therefrom. Therefore, under some conditions it is necessary to vary the adsorption mode of operation with respect to the desorption mode of operation. To achieve this variance in the operational cycle in the separator apparatus 10, an operational limiter valve 150 is designed to reduce the time period that the pressurized fluid mixtue is communicated to the control chamber 62 from the pressurizing chamber 38.

The operational limiter valve 150 includes a sleeve 154 with an annular face 156 and a bearing surface 156. The bearing surface 158 is located in bore 160 extending from port 24. A spring 162 acts on the bearing surface and moves the same into engagement with a stop or snap ring 164.

When piston member 22 moves toward the pressurizing chamber 38, face 156 engages the wall 40 and inhibits the communication from the majority of the pressurizing chamber 38 into the control chamber 62 through opening 66. The piston member 22 continues to move to the top of the stroke without any further substantial amount of the fixed volume being communicated to the single bed of adsorption particles in the retention chamber 52.

After the engagement of face 156 and wall 40, the fluid pressure in the pressurizing chamber 38 continues to increase requiring a relief valve 152 to assure that the housing 20 and associated end plate 18 are not damaged. The relief valve 152 includes a disc 166 resiliently held against a seat 168 by a spring 170. The face of the spring 170 is such that a force greater than point 154, shown in FIG. 14, is required to move the face 166 away from the seat 168 to provide a flow path to the atmosphere.

The purge cycle of this separator apparatus is identical to that in FIG. 1 and therefore does not need any further explanation.

Figure 7:
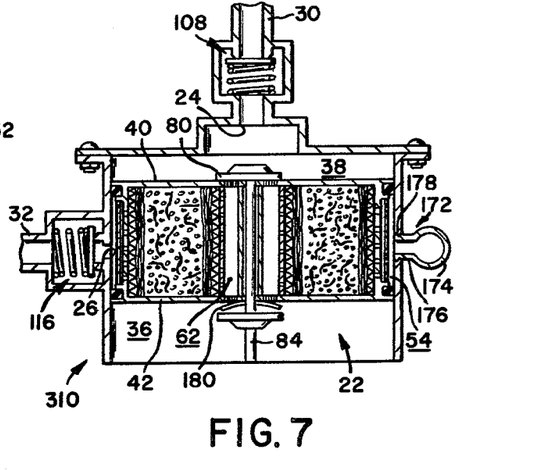
FIG. 7 is a sectional view of the separator apparatus in FIG. 1 showing a secondary chamber for storing a portion of the product from the single bed of adsorption particles.

The separator apparatus 310 disclosed in FIG. 7 is identical to that in FIG. 1 with the exception of a secondary chamber 172 connected to the housing 20 for providing the header chamber 54 with an auxiliary volume of product effluent to purge the component from the bed of adsorption particles and to assure that the flow of the product effluent through the bed of adsorption particles does not follow a flow path directly toward port 26 but is equally distributed to the header chamber 54.

The secondary chamber 172 includes a housing 174 with a neck 176 thereon which is attached to port 178 by threads.

During pressurizing of the fluid mixture in chamber 38, the resultant product effluent flows through the bed of adsorption particles, through the restrictor plate 58 into the chamber 54. The product effluent flows from the header chamber 54 into the secondary chamber 172. When the second valve 116 opens the product effluent flows through conduit 32 for distribution to the product effluent responsive second valve 116.

When push rod 84 moves the first control face 80 against the wall 40, the second control face 82 moves away from wall 42, as shown in FIG. 7, to allow the product effluent in the secondary chamber 172 and header chamber 54 to flow through opening 60 in restrictor plate 58 and purge the bed of adsorption particles of the component retained thereon. This purge portion of the cycle continues until the pressure in the secondary chamber 172, header chamber 54, retainer chamber 52, control chamber 62 and expansion chamber 36 are equal. The extra volume of product effluent present in secondary chamber 172 provides an additional fluid volume required to remove some components from the surface of the adsorption particles.

In addition, a flapper valve 180 attached to the wall 42 is designed to close whenever a positive pressure differential occurs between the expansion chamber 36 and the control chamber 62. Thus, the wall 42 can move to expel the product effluent and component through port 28 without any being returned to the control chamber 62.

Figure 8:
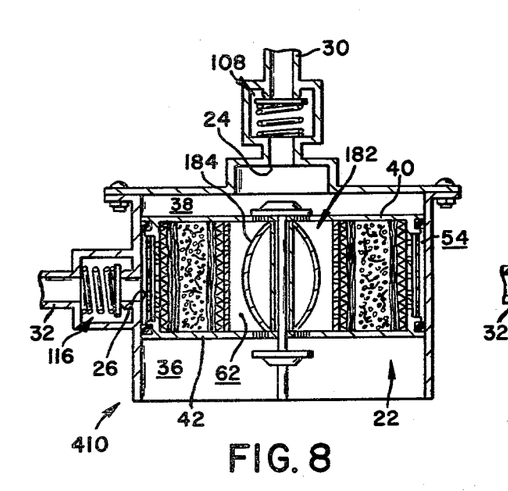
FIG. 8 is a sectional view of the separator apparatus in FIG. 1 showing a means for changing the flow characteristics of a fluid mixture into the single bed of adsorption particles by minimizing the volume of a centrl distribution control chamber.

The separator apparatus 410 disclosed in FIG. 8 has a sleeve member 182 attached to the walls 40 and 42 to control the flow path of the fluid mixture and the product effluent and component through the control chamber 62. The sleeve 182, as shown, has a curved surface 184 that may be needed to minimize the volume of the control chamber 62 when the flow path through the adsorbent bed is short as compared to its length to thereby minimize the discharge of compressed gas.

Figure 9:
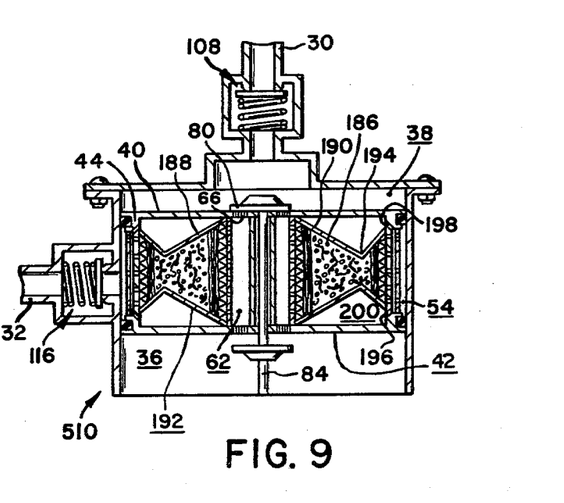
FIG. 9 is a sectional view of the separator apparatus in FIG. 1 showing a means for providing a uniform flow cross section through the single bed of adsorption particles.

The separator apparatus 510 disclosed in FIG. 9 has a conical or venturi shaped retention chamber 188 for providing a uniform cross sectional area for the bed of adsorption particles 186.

The conical shaped retention chamber 188 has a first wall 190 attached to wall 40 and a second wall 192 attached to wall 42. The resulting throat 194 is located adjacent the cylindrical member 44. Passages 196 and 198 connect the header chamber 54 with a purge chamber 200 located between the walls 40 and 42.

In operation, the pressurized fluid mixture flows into the bed of adsorption particles and uniformly raises the pressure level therein. The product effluent resulting therefrom flows into the header chamber 54 and through passages 196 and 198 for distribution to the purge chamber 200.

As shown in FIG. 9, when the push rod 84 moves the face member 80 against wall 40, communication through passages is interrupted and the product effluent in the purge chamber 200 flows into header chamber 54 for distribution through the bed of adsorption particles to purge or desorb any component adsorbed thereon in the adsorption part of the operational cycle. This added volume of product effluent assures that the bed of adsorption particles is relatively free of the component at the beginning of the pressurizing part of the operational cycle.

Figure 10:
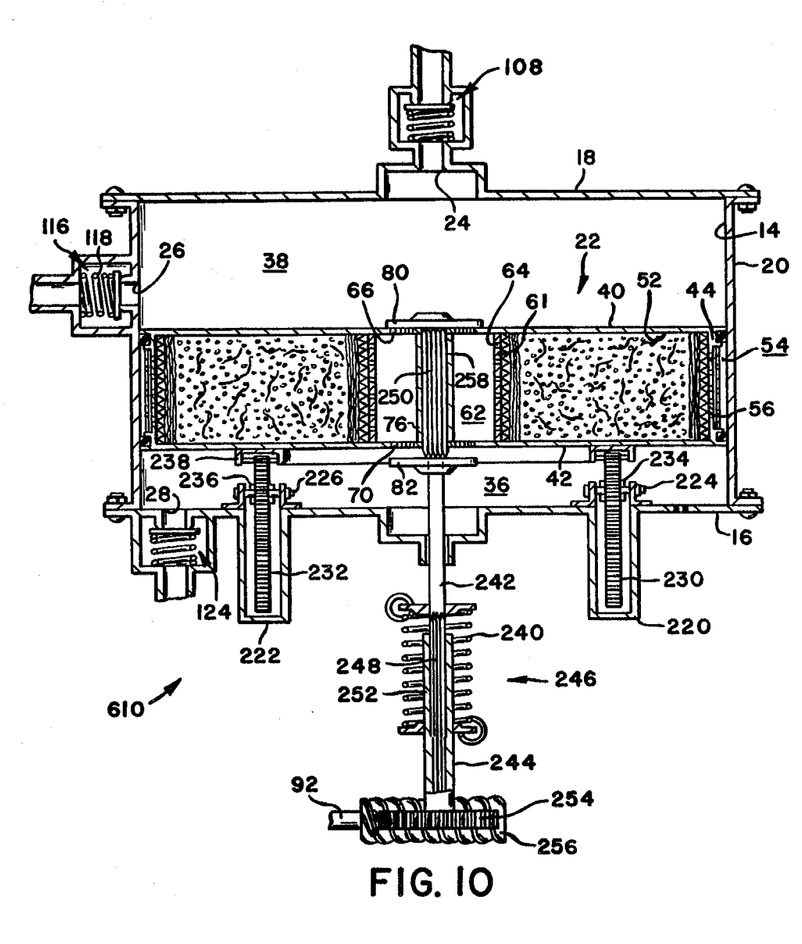
FIG. 10 is a sectional view of a fluid separator apparatus illustrating a secondary motor means for reciprocably moving a single bed of adsorption particles in a bore.

The separator apparatus 610 disclosed in FIG. 10 has a rotary input shaft 92 to develop the reciprocating motion of the piston 22 in bore 14. End plate 16 has first and second projections 220 and 222 extending thereform. First and second axles 224 and 226 are attached to the end plate 16 which are located adjacent projection 220 and 222 in a plane perpendicular to the cylindrical body 20. Hubs 234 and 236 are located on axles 224 and 226 to align gears 230 and 232 in a plane parallel to bore 14. A ring gear 234 attached to wall 42 is brought into engagement with gears 230 and 232 by a spring 240 on splined linkage 246. The splined linkage 246 has a first shaft 242 and a second shaft 244. The first shaft 242 has a first splined end 248 and a second splined end 250. Splined end 250 is located in a splined section 258 on guide 76. Splined end 248 telescopes into a corresponding splined end 252 on the second shaft 244. A gear 254 connects shaft 244 with worm gear 256 on shaft 92.

In operation, a rotative torque supplied to shaft 92 causes a corresponding rotative torque to be applied to shaft 244. The splined linkage 246 transmits torque from shaft 244 directly into shaft 242 which rotates the piston member 22. As piston member 22 rotates, ring gear 238 engages eccentric gears 230 and 232. Since spring 240 holds the ring gears 238 in contact with eccentric gears 230 and 232, the piston member reciprocates in bore 14 from the bottom of a stroke in the expansion chamber 36 to the top of a stroke in the pressurizing chamber 38. The desorption and adsorption modes of an operational cycle of the single bed of adsorption particles when brought into communication with a pressurized fluid mixture to produce a product effluent and a lower pressure chamber to purge the bed is the same as that described with respect to FIG. 1.

Figure 11:
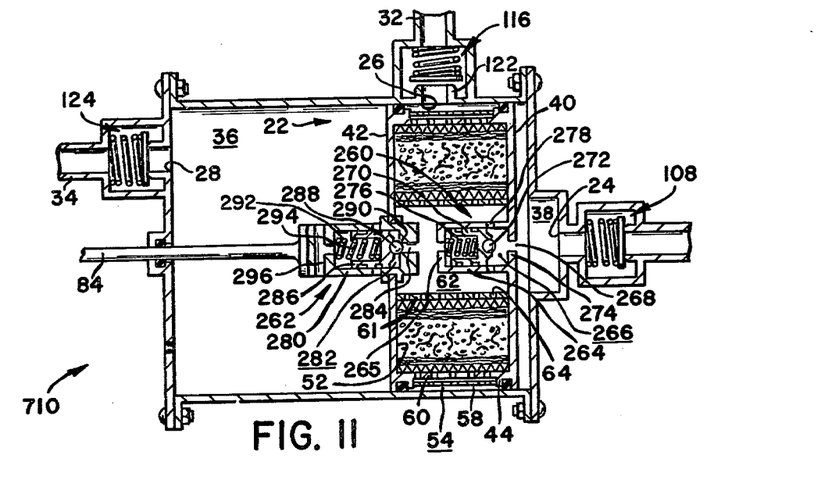
FIG. 11 is a sectional view of a separator apparatus illustrating a secondary means of controlling the communication between a single bed of adsorption particles, the pressurizing, and evacuation chambers.

The separator apparatus 710 shown in FIG. 11 is identical to the separator apparatus disclosed in FIG. 1 with the exception of the first and second control valves 260 and 262.

The first control valve 260 has a housing 264 attached to wall 40 with a bore 266 located therein connected to pressurizing chamber 38 through opening or passage 268. A piston 270 located in bore 266 has a ball poppet, or plate 272 on the end thereof which is urged toward a seat 274 by a spring 276. A cross bore 278 connects bore 266 to the control chamber 62.

The second control valve 262 has a housing 280 attached to wall 42 with a bore 282 located therein connected to the control chamber 62 through opening or passage 284. A piston 286 located in bore 282 has a ball poppet or plate 288 on the end thereof which is urged toward a seat 290 by a spring 292. A cross bore 294 conencts bore 282 with the expansion chamber 36.

In operation, when the fluid pressure in the bed of adsorption particles reaches a peak predetermined pressure level and acts on ball 288, the piston is moved away from seat 290. When the ball 288 moves away from the seat 290, the fluid pressure acts on the piston 286 and rapidly moves and holds the piston 286 against stop 296 to allow the product effluent to purge the bed of adsorption particles in retainer chamber 52 of the component absorbed on the surface thereof.

When ball 288 of piston 286 is moved away from seat 290, a pressure drop occurs in the control 62 such that spring 276 moves ball 272 against seat 274 to interrupt communication from pressurizing chamber 38 into the control chamber 62.

As piston member 22 approaches the bottom of its stroke, a positive pressure is created in expansion chamber 36. This positive pressure allows spring 294 to seat ball 288 on seat 290 to interrupt communication to the expansion chamber 36 from the control chamber 62. Thereafter the positive pressure acts to open valve 124 and expel the product effluent and component through the discharge port without any back flow into the control chamber 62.

When piston member 22 reaches the bottom of its stroke, the direction is reversed and face 40 begins to pressurize the fixed volume of the fluid mixture in the pressurizing chamber 38. When a predetermined fluid pressure is developed in the pressurizing chamber 38, ball 272 moves away from seat 274 and thereafter acts on piston 270 which is urged against stop 265. Thereafter, the pressurized fluid mixture flows into the control chamber 62 for distribution through the bed of adsorption particles in retention bed 52.

The second valve 116 prevents any product effluent communicated to header chamber 54 until an active adsorption fluid pressure level is achieved in the bed of adsorption particles. Thereafter the product effluent flows past seat 122 through conduit 32 for distribution to the product effluent responsive device.

When a negative fluid pressure level is achieved in expansion chamber 36 through the expansion of the product effluent and component therein, the fluid mixture fluid pressure acts on ball 288 to move the piston away from seat 290 and opens communication between the control chamber 62 and the expansion chamber and begin a new cycle of operation as the piston 22 returns from the top of the stroke.

Figure 12:
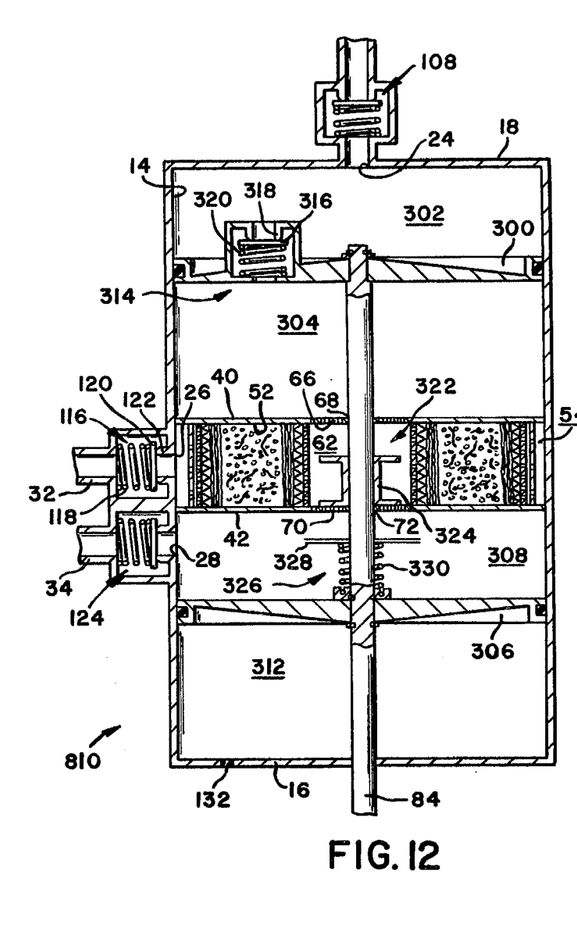
FIG. 12 is a sectional view of a fluid separator apparatus having a fixed bed of adsorption particles located in a bore between a pressurizing and evacuation piston.

The separator apparatus disclosed in FIG. 12 has a single bed of adsorption particles located between walls 40 and 42 in a fixed position adjacent the port 26. A first piston 300 separates the bore 14 between wall 40 and end plate 18 into a supply chamber 302 and a pressurizing chamber 304. A second piston 306 separates the bore 14 between wall 42 and end plate 16 into an expansion chamber 308 and an atmospheric chamber 312.

A first valve 314 attached to the first piston 300 controls the flow of the fluid mixture from the supply chamber 302 into the pressurizing chamber 304. Valve 314 has a disc 316 urged toward a seat 318 by a spring 320.

A second valve 322 located in the control chamber 62 has a split spool 324 frictionally carried on push rod 84 to control the communication between the control chamber 62, the pressurizing chamber 304, and the expansion chamber 308.

A discharge valve 326 has a face 328 which is resiliently positioned away from the second piston 306 by spring 330.

The separator apparatus 810 in FIG. 12 is illustrated in the adsorption part of the cycle. Push rod 84 pulls the first and second pistons 300 and 306 toward the pressurizing chamber 304 and the atmospheric chamber 312. As the piston moves in the adsorption mode, valve 108 opens and allows a fixed volume of fluid mixture to flow into the supply chamber 302. At the same time, the fluid pressure of the fluid mixture in the pressurizing chamber 304, the control chamber 62, the retention chamber 52 and header chamber 54 increases while the fluid pressure in the expansion chamber 308 decreases to create a pressure differential across spool 324. This pressure differential acts on and moves the spool against wall 42 to prevent communication from the control chamber 62 to the expansion chamber.

The fluid pressure in the pressurizing chamber 304 increases until an active adsorption pressure level develops in the bed of adsorption particles. Thereafter, spring 118 is overcome and face 120 moves away from seat 122 to allow the product effluent in header chamber 54 to flow into conduit 32 for distribution to the product effluent responsive device.

At the top of the stroke of the push rod 84, push rod 84 moves pistons 300 and 306 toward the supply chamber 302 and expansion chamber 308. Spool valve 324 is frictionally carried on push rod 84 and at the top of the stroke moves away from openings 72 into engagement with openings 66 to terminate communication with the pressurizing chamber 304 into the control chamber 62 and initiate communication from the control chamber 62 to the expansion chamber 308. The product effluent in the header chamber 54 flows through the bed of adsorption particles in retainer chamber 52 and purges any component absorbed on the surface thereby flowing toward the expansion chamber 308 because of the negative or lower fluid pressure contained therein.

The product effluent and component flow into the expansion chamber 308 until the fluid pressure in the header chamber 54, retention chamber 52, control chamber 62, and expansion chamber 308 are equal.

At this point in time, face 328 engages housing 42 and interrupts the communication between the control chamber 62 and the expansion chamber 308. Further movement of piston 306 toward wall 42 creates a positive pressure which expels the product effluent and component through port 28 to the atmosphere through discharge conduit 34.

As piston 300 moves toward the supply chamber 302, spring 320 is overcome and a fixed volume of fluid mixture presented in the supply chamber flows into the pressurizing chamber 304.

At the bottom of the stroke, push rod 84 moves spool valve 324 against wall 42 to again initiate the adsorption mode in the operational cycle.

Figure 13:
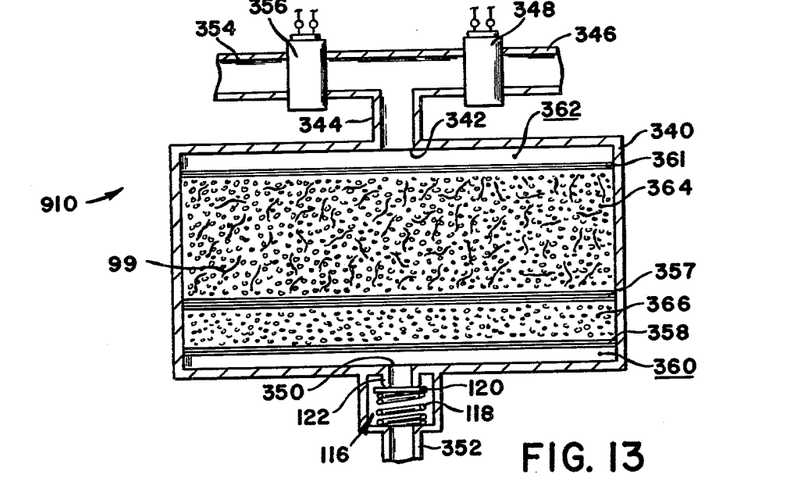
FIG. 13 is a sectional view of a fluid separator illustrating a single bed of adsorption particles connected to a source of pressurized fluid and vacuum through a first port and to a product effluent discharge conduit through a second port operating in a manner taught by this invention.

The separator apparatus 910 disclosed in FIG. 13 has a housing 340 with a first port 342 connected to a conduit 344 and a second port 350 connected to a product effluent distributor conduit 352. Conduit 344 is connected to a conduit 346 through which a source of pressurized fluid is communicated to solenoid valve 348 and to a discharge conduit 354 through solenoid valve 356.

A bed of absorption particles is located in housing 342 by a retainer plate 358 to establish a header chamber 360 adjacent port 350 and by a retainer plate 361 to establish a control chamber 362 adjacent port 342. First and second felt and screen filters 364 and 366 are located adjacent the retainer plates 361 and 358, respectively, to assure that all the absorption particles are retained in the single bed during the cycling between the absorption and desorption modes of operation. In addition, restrictor plate 357 is located in the bed of adsorption particles to delay the communication therethrough until an active adsorption pressure level is achieved during adsorption and to meter the flow of product effluent which purges the component from the bed of adsorption particles during the desorption part of the operational cycle.

In the absorption part of the operational cycle, solenoid valve 348 is provided with an electrical activation signal which allows pressurized fluid mixture to flow from conduit 346 through port 342 into the control chamber 362. The fluid pressure in the housing builds up until a saturation or active adsorption fluid pressure level is achieved in the bed of absorption particles. Thereafter, the pressurized fluid mixture flows through the bed of absorption particles in retention chamber 352 into the header chamber 360 and past seat 122 by overcoming spring 118 in valve 116 for distribution through conduit 352. The flow of the pressurized fluid mixture from conduit 346 continues until a predetermined fixed fluid volume is presented to the bed of absorption particles.

Thereafter, the electrical activation signal to solenoid valve 248 is terminated and activation signal is transmitted to solenoid valve 356.

With solenoid valve 356 activated, the control chamber 362 is connected to the discharge conduit 354.

To achieve rapid desorption of the component retained in the bed of absorption particles, discharge conduit 354 is connected to a negative pressure or vacuum source. Thus, the product effluent in header chamber 360 flows through the bed of absorption particles to purge the component absorbed thereon and cleanse the bed. After a predetermined time period, the activation signal to solenoid valve 356 is terminated and solenoid valve 348 again activated to initiate another operational cycle in the separator apparatus 910.

Figure 15:
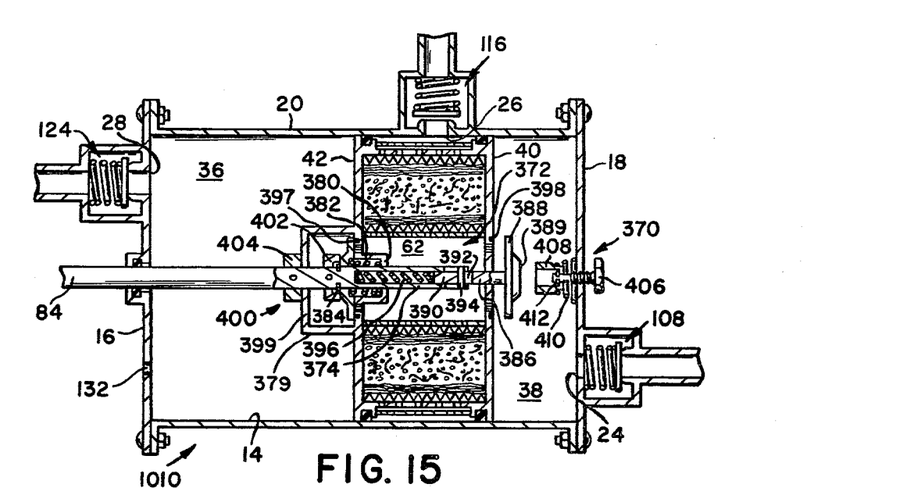
FIG. 15 is a sectional view of a separator apparatus illustrating a means for sequentially operating a control valve prior to a change in direction of a reciprocal movable piston to assure that adsorption of a bed of adsorption particles terminates prior to desorption.

The separator apparatus 1010 disclosed in FIG. 15 is identical to that in FIG. 1 with the exception that the first port 24 is offset from the center line of the housing, a bumper member 370 is located in an axial line with push rod 84, and a plunger member 372 extends from push rod 84 to control communication between control chamber 62 and the pressurizing chamber 38 and expansion chamber 36.

The plunger member 372 has a tubular member 374 which extends through bearing surface 380 into the control chamber 62. A stem 386 attached to a first face member 388 has an end 390 which telescopingly extends into the tubular member 374. The stem 386 has a slot 392 therein through which pin 394 extends for attaching the stem 386 to the tubular member 374. A spring 396 located in the tubular member 374 urges the first face member 388 away from the first wall 40.

A second face member 378 located on the push rod 84 is urged against a stop 384 by a spring 382 to provide independent movement between the second face member 378, the second wall 42 and push rod 84.

A driving plate 396 attached to the second wall 42 provides a guide for push rod 84 to assure a seal develops across seats 397 and 398 upon engagement of the first and second face members 388 and 378 with walls 40 and 42, respectively.

A driving collar 400 having a first face 404 and a second face 402 is fixed to the push rod 84 on opposite sides of the driving plate 396. The distance between the first and second faces 402 and 404 is equal to the length of slot 392 and as such, controls the sequential engagement of the first and second face members 388 and 378 with the first and second walls 40 and 42.

The bumper member 370 includes an adjustable bolt 406 which extends through housing 16 with a head 408 attached thereto in the pressurizing chamber 38. A spring 410 holds the head 408 against a stop 412 on the end of bolt 406.

In operation, on the down stroke of the push rod 84, the first face 404 on the collar 400 engages driving plate 396 and at the same time the second face 402 engages the second face member 378 to move face 376 on to seat 397 to interrupt communication from expansion chamber 36 into control chamber 62.

At the same time, spring 396 moves the first face 388 away from the first wall 40 to allow communication from pressurizing chamber 38 into the control chamber 62.

As piston 22 moves in bore 14 the fluid pressure in the pressurizing chamber 38 increases and is communicated into the control chamber 62 for distribution to the bed of adsorption particles. The bed of adsorption particles adsorbs a component from the pressurized fluid mixture and a product effluent flows into the header chamber 54. The header chamber 54 retains the product effluent until wall 40 moves past the second port 26 and an adsorption fluid pressure level is achieved therein sufficient to overcome spring 118. Thereafter the pressurized fluid mixture pushes a corresponding volume of product effluent through the second port 26 for distribution through conduit 32.

As piston 22 approaches the end of the down stroke, surface 389 engages bumper face 408 to move face 388 toward seat 398. Tubular member 374 continues to move as pin 394 moves in slot 392.

At the bottom of the down stroke, push rod 84 reverses direction moving face 402 on collar 400 against driving plate 396 and pin 394 against the bottom of slot 392. During this movement, piston 22 remains stationary; however, spring 382 moves the second face member 378 away from seat 397 to initiate communication between control chamber 62 and the evacuated expansion chamber 36. At the same time, spring 410 holds the first face 388 against wall 40 to prevent communication from the pressurizing chamber 38 into the control chamber 62. Thereafter, the push rod 84 moves the piston 22 in the up stroke to draw a fixed volume of fluid mixture into the pressurizing chamber 38. As the piston 22 approaches the top of the up stroke, a positive pressure develops in the expansion chamber 36. This positive pressure acts on the second face member 376 and in opposition to spring 382 moves the second face member 376 against seat 397 to segregate the expansion chamber 36 from the control chamber 62. For the remainder of the upstroke, product effluent and the component purged from the bed of adsorption particles is pushed through port 28 to be disposed of through the discharge conduit 34.

Upon passing the top of the up stroke, piston 22 remains stationary for a moment as push rod 84 again moves face 404 into engagement with driving plate 396 and face 402 into engagement with the second face 378 while spring 396 moves the first face 388 away from seat 398 to initiate another cycle of operation.

Each of the separator apparatus in this invention disclosed in FIGS. 1-15 involve a single bed of absorption particles capable of separating a component from a fluid mixture to produce a product effluent. However, the principals equally apply to a two-bed system wherein it is desired to conserve energy in the production of a product effluent.

Figure 16:
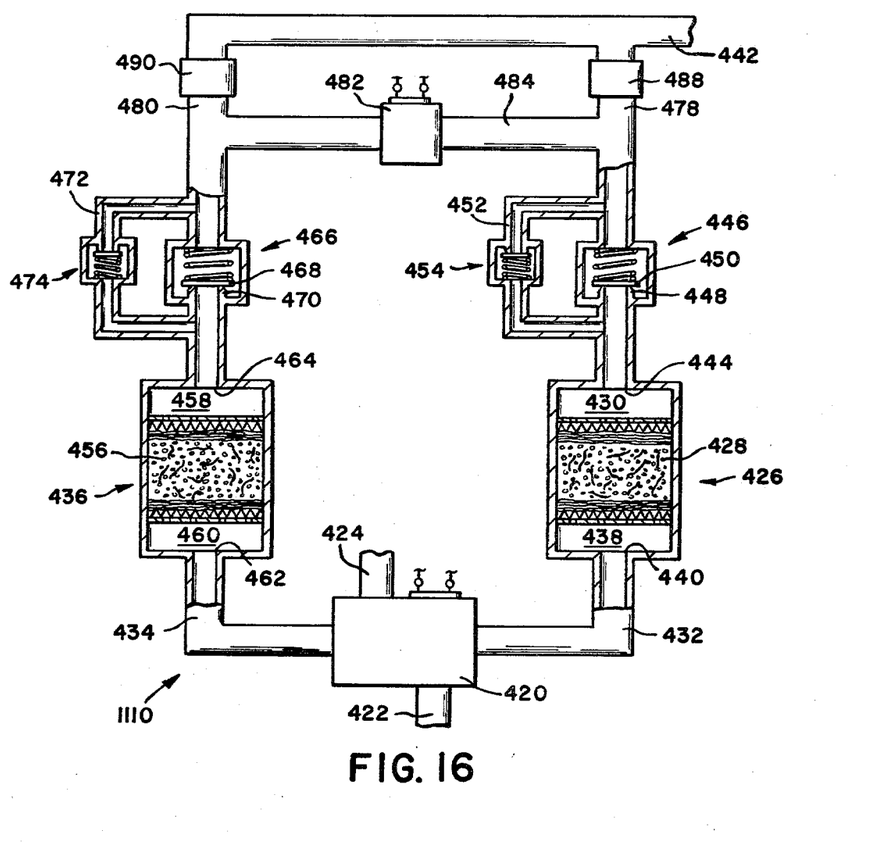
FIG. 16 is a sectional view of a separator apparatus having two beds of adsorption material operating according to the principals of the invention to produce a substantially continuous flow of product effluent.

The fluid separator 1110 in FIG. 16 which illustrates a two-bed system is similar in operation to the fluid separator 910 described in FIG. 13. The two-bed system or, if desired, any plurality of beds of adsorption material can be connected to a product effluent conduit to provide for a substantially continuous production of the product effluent.

The solenoid valve member 420 is connected to a source of pressurized fluid mixture through supply conduit 422 and a discharge conduit 424. A conduit 432 connects solenoid valve 420 with a first housing 426 and a conduit 434 connects solenoid valve 420 with a second housing 436.

A first bed of adsorption material 428 separates a cavity in housing 426 into a header or plenum chamber 430 and a distribution chamber 438. The distribution chamber 438 is connected to conduit 432 through a port 440 while the header chamber 430 is connected to a product effluent distribution conduit 442 through port 444 by a conduit 478.

A control valve 446 located adjacent port 444 has a face 450 resiliently urged towards seat 448 to regulate and delay the communication of product effluent from the header chamber 430 until an active adsorption pressure level is achieved in the bed of adsorption particles 428.

However, a by pass conduit 452 connects the product effluent distribution conduit 442 with the header chamber 430. One-way check valve 454 is located in by pass conduit 452 to allow a quantity of product effluent to be communicated therethrough to aid in the purging of the component from the bed of adsorption particles 428.

Similarly, a second bed of adsorption material 456 separates the second housing 436 into a header chamber 458 and a distribution chamber 460. The distribution chamber 460 is connected to conduit 334 through port 462 and the header chamber 458 is connected to product effluent distribution conduit 442 through port 464 by a conduit 480. A control valve 466 located adjacent port 464 has a face 468 resiliently urged against a seat 470 to regulate and delay the communication of product effluent from header chamber 458 until an active adsorption pressure level is achieved in the bed of adsorption particles 456.

However, a by pass conduit 472 connects the product effluent distribution conduit 442 with header chamber 458. A one-way check valve 474 is located in the by pass conduit 472 to allow a quantity of product effluent to be communicated therethrough to aid in the purging of any component adsorbed in the bed of adsorption particles 456.

A solenoid valve 482 located in conduit 484 has a fixed flow rate orifice therein which allows for continuous communication between conduit 478 and 480 and an opened position which allows for free communication between conduits 478 and 480.

In operation, solenoid valve 420 directs a supply of pressurized fluid mixture (air) through conduit 432 to the distribution chamber 438 in the first housing 426. The pressurized fluid mixture flows from the distribution chamber 438 into the bed of adsorption particles 428 where a component is retained as a product effluent flows to the header chamber 430.

Control valve 446 retains the product effluent in the header chamber until an active adsorption fluid pressure level is achieved sufficient to move face 448 away from seat 450. Thereafter, the product effluent flows past one-way check valve 488 in conduit 478 to the distribution conduit 442. A portion of the product effluent in conduit 478 flows past the fixed flow orifice in solenoid valve 482 to conduit 480 and through by pass conduit 472 for distribution to header chamber 458 to aid in purging any component previously adsorbed in the bed of adsorption particles 456.

After a period of time, solenoid valve 420 interrupts the communication of the pressurized fluid mixture through conduit 432 and solenoid valve 482 opens and allows the pressure in bed 456 to equalize with that in conduit 478. Thereafter, solenoid valve 420 allows the pressurized fluid mixture to flow to bed 456 while opening port 440 to distribution conduit 424. At this time, the pressurized product effluent in the header chamber reverses its flow direction by flowing back through the first bed 426 where the component previously adsorbed is picked up and carried to the discharge conduit. At this point in time, the restriction of flow of the product effluent should be overcome by the active adsorption pressure level moving face 468 away from seat 470 and product effluent communicated through one-way check valve 490 to the distribution conduit 442. At the same time, a portion of this product effluent passes through the fixed orifice in solenoid valve 482 for distribution through by pass conduit 452 to aid in the purging of component from the bed of adsorption particles 428.

After a set time period, solenoid valve 420 interrupts the communication of the pressurized fluid mixture to the bed of adsorption particles 456 and the mode of adsorption shifts to the bed of adsorption particles 428.

I claim:

1. An apparatus for separating a product effluent from a fluid mixture comprising:

a housing having a chamber therein with a first port, a second port and a third port, said first port being in communication with said fluid mixture, said second port being connected to a product effluent responsive device, and said third port being connected to a discharge conduit;

wall means for retaining a bed of adsorption particles in said chamber, said wall means forming a header chamber between said bed of adsorption particles and said second port in said housing, said wall means dividing said chamber into an expansion chamber and a pressurizing chamber, said expansion chamber being connected to said third port and said pressurizing chamber being connected to said first port;

first valve means for allowing a fixed volume of said fluid mixture to flow through said first port during a first part of an operational cycle and for preventing fluid flow from the chamber during a second part of the operational cycle when said fluid mixture is presented to the bed of adsorption particles where a component is adsorbed and the product effluent communicated to said header chamber;

second valve means for preventing communication of any product effluent from said header chamber whenever the fluid pressure level in said chamber is below a predetermined value;

third valve means for allowing said product effluent to flow from the header chamber and purge said bed of adsorption particles of said component by flowing through said third port during said first part of the operational cycle and for preventing fluid flow through said third port during said second part of the operational cycle; and motor means for reciprocating the wall means in the chamber to compress the fluid mixture in the pressurizing chamber and expanding the product effluent and component in the expansion chamber during the second part of the operational cycle, and to expand the fluid mixture in the pressurizing chamber and thereby draw said fluid mixture past said first port to establish said fixed volume of fluid mixture in the pressurizing chamber and to compress the product effluent and component in said expansion chamber when an equilibrium fluid pressure is achieved with the product effluent in the header chamber and thereby discharge the product effluent and component from the expansion chamber through said third port.

2. The apparatus as recited in claim 1 further including:

a relief chamber connected to said header chamber for storing a product effluent during said second part of the operational cycle to provide a uniform flow distribution plenum for the product effluent through said bed of adsorption particles and to provide additional product effluent to purge the component from the bed of adsorption particles during said first part of the operational cycle.

3. The apparatus, as recited in claim 2 further including:

a flapper valve connected to said wall means and responsive to a positive pressure in said expansion chamber for preventing the communication of product effluent and the purged component from flowing into the control chamber.

4. The apparatus, as recited in claim 3 further including:

plastic fibers mixed with the bed of adsorption particles to loosely hold the individual adsorption particles in a substantially fixed position adjacent said wall means, said plastic fibers adsorbing impact forces transmitted to said individual particles of adsorption particles by the pressurized fluid mixture and product effluent and thereby prevent structural degradation thereof by frictional rubbing between the individual particles which constitute the bed.

5. The apparatus, as recited in claim 1 wherein said wall means further includes:

a control chamber for connecting the bed of adsorption particles with said pressurizing and expansion chambers.

6. The apparatus, as recited in claim 5 wherein said motor means further includes:

a plunger which extends through said control chamber, said plunger having a first face located in said pressurizing chamber and a second face located in said expansion chamber, said first face engaging said wall means to seal said pressurizing chamber from said control chamber in said first part of the operational cycle and second face engaging said wall means to seal said expansion chamber from said control chamber in said second part of the operational cycle.

7. The apparatus, as recited in claim 6 further including:

a sleeve located in said pressurizing chamber; and a spring connected to said housing for urging said sleeve toward said wall means, said wall means engaging said sleeve during said second part of the operational cycle to limit the flow of the pressurized fluid mixture into said control chamber.

8. The apparatus, as recited in claim 6 further including:

a relief chamber connected to said header chamber for storing a product effluent during said second part of the operational cycle to provide a uniform flow distribution plenum for the product effluent through said bed of adsorption particles and to provide additional product effluent to purge the component from the bed of adsorption particles during said first part of the operational cycle.

9. The apparatus, as recited in claim 6 further including:

a flapper valve connected to said wall means and responsive to a positive pressure in said expansion chamber for preventing the communication of product effluent and the purged component from flowing into the control chamber.

10. The apparatus, as recited in claim 6 further including:

a cylinder located in said control chamber for controlling the radial size of the bed of adsorption particles to balance the fluid dynamics of the flow of the fluid mixture through the bed of adsorption particles during the second part of the operational cycle with the flow of the product effluent and component through the bed of adsorption particles during the first part of the operational cycle.

11. The apparatus, as recited in claim 6 further including:

a conical housing having a base connected to the control chamber and a head connected to the header chamber, said conical housing retaining said bed of adsorption particles, said conical housing providing a controlled incremental change in fluid pressure in said bed of adsorption particles during said first part of the operational cycle.

12. The apparatus, as recited in claim 11 further including:
a purge chamber created between said conical housing and the wall means, said purge chamber being connected to said header chamber for storing product effluent during said second part of the operational cycle which flows through and desorbs the component from the bed of adsorption particles during the first part of the operational cycle.

13. The apparatus, as recited in claim 6 wherein said housing further includes:
a bleed port connected to the expansion chamber to limit the expansion fluid pressure during the second part of the operational cycle.

14. The apparatus, as recited in claim 6 further including:
a plate for restricting the flow of the product effluent into the header chamber during the second part of the operational cycle to reduce the time required to generate the active adsorption pressure of the fluid mixture in the bed of adsorption particles and to meter the purge flow into the expansion chamber during the first part of the operational cycle.

15. The apparatus, as recited in claim 6, wherein said plunger includes:
a tubular member attached to one of said first and second faces on the plunger;
a stem member attached to the other of said first and second faces on the plunger and telescoping into said tubular member;
a spring located in said tubular member for urging said first face away from said first wall to allow said first face to seat on said first wall prior to termination of the second part of the operational cycle.

16. The apparatus as recited in claim 6, further including:
an adjustable bumper which engages said first face upon termination of communication of the pressurized fluid to the control chamber and allows the plunger to move the second face away from the second wall to initiate communication between the control chamber and the expansion chamber and allow the product effluent to purge the component from the bed of adsorption particles.

17. The apparatus, as recited in claim 5 further including:
a first control valve connected to said wall means and responsive to a fluid pressure in said pressurizing chamber for allowing the fluid mixture to flow into the control chamber during said second part of the cycle; and
a second control valve attached to said wall means, said second control valve being responsive to a fluid pressure differential between the control chamber and the expansion chamber for allowing the product effluent and component to flow into the expansion chamber during said first part of the operational cycle.

18. The apparatus, as recited in claim 17 further includes:
linkage means extending through the housing and connected to said second control valve for directly moving wall means in said chamber in response to an input from said motor means.

19. The apparatus, as recited in claim 1 further including:
plastic fibers for forming a matrix for holding the bed of adsorption particles in a substantially fixed position adjacent said wall means, said plastic fibers absorbing impact forces transmitted to said individual particles of adsorption particles by the pressurized fluid mixture and product effluent and thereby prevent structural degradation thereof by frictional rubbing between the individual particles which constitute the bed.

20. An apparatus for separating a product effluent from a fluid mixture comprising:
a housing having a bore therein with a first port, a second port and a third port, said first port being connected to a source of fluid mixture, said second port being connected to a product effluent responsive device, said third port being connected to a discharge conduit;
piston means located in said housing for separating said bore into a pressurizing chamber and an expansion chamber, said piston having a separating chamber therein for retaining a bed of adsorption particles; and
motor means for reciprocating said piston means in said bore to pressurize a fixed volume of the fluid mixture in the pressurizing chamber while expanding any fluid in said expansion chamber during the down stroke of the piston means, said pressurized fluid mixture from the pressurizing chamber being communicated to the separation chamber where a component in the fluid mixture is adsorbed in said bed of adsorption particles and the product effluent communicated to said second port during said down stroke, and said component being purged from said bed of adsorption particles by the product effluent flowing into the expansion chamber on the up stroke of the piston means while the fixed volume of the fluid mixture is drawn into said pressurizing chamber to complete a cycle of operation.

21. The apparatus, as recited in claim 20, wherein said piston means further includes:
a first wall separated from a second wall by a cylindrical member to establish a header chamber with said housing in said bore for storing a portion of said product effluent on said down stroke; and
a sleeve connected to the first and second walls for establishing a control chamber in said piston means through which the pressurized fluid mixture is presented to the bed of adsorption particles on the down stroke of the piston means and the product effluent and desorbed component is communicated to the expansion chamber on the up stroke of the piston means.

22. The apparatus, as recited in claim 21, wherein said motor means includes:
linkage means extending through said piston means having a first face adjacent said first wall and a second face adjacent said second wall, said first face engaging said first wall to prevent communication between the pressurizing chamber and the control chamber on the up stroke of the piston means and between the expansion chamber and the control chamber on the down stroke of the piston means.

23. The apparatus, as recited in claim 22, further including:
valve means for delaying the communication of any product effluent from the header chamber on the down stroke until an active adsorption fluid pressure level is created in said bed of adsorption particles by the pressurized fluid mixture to produce a product effluent substantially free of the component adsorbable by said bed of adsorption particles.

24. The apparatus, as recited in claim 20, further includes:
a ring gear attached to said piston means; and
an eccentric gear means attached to said housing and engageable with said ring gear, said motor means providing said piston means with rotative torque causing the ring gear to engage the eccentric gear and thereby move the piston means along a linear path in said chamber.

25. The apparatus, as recited in claim 20, further including:
a quantity of plastic fibers randomly located in said separation chamber to prevent structural degradation of the individual particles in the bed of adsorption particles through frictional rubbing caused by the flow of the fluid mixture and product effluent therethrough.

26. A single bed separator for extracting a component from a fluid mixture to produce a product effluent comprising:
a housing having a bore therein, said housing having a first port connected to a source of fluid mixture, a second port connected to a product effluent responsive device and a third port connected to a discharge conduit;
a piston located in said bore having a cavity therein for retaining a bed of adsorption particles, said piston separating the bore into an expansion chamber and a pressurizing chamber, said piston having a groove adjacent the bore connected to said cavity through a passageway in said piston, a first opening for connecting said cavity with said pressurizing chamber, and a second opening for connecting said cavity with said expansion chamber; and
means for providing said piston with reciprocal motion in said bore to establish an up stroke and a down stroke in a cycle of operation, said piston on the down stroke lowering the fluid pressure in the expansion chamber while pressurizing a fixed volume of fluid mixture in the pressurizing chamber which is communicated through said first opening where a component is adsorbed in said bed of adsorption particles as said product effluent flows through said passageway into said groove to develop an active adsorption fluid pressure level in said bed of adsorption particles, said groove retaining said product effluent until said groove is communicated with said second port through the movement of said piston, said piston on the up stroke drawing the fixed volume of fluid mixture into said pressurizing chamber while allowing said product effluent to flow from the groove through the second opening into the expansion chamber to purge said component from said bed of adsorption particles.

27. An apparatus for separating a product effluent from a fluid mixture comprising:
a housing having a chamber therein with a first port, a second port and a third port, said first port being in communication with said fluid mixture, said second port being connected to a product effluent responsive device, and said third port being connected to a discharge conduit;
wall means for retaining a bed of adsorption particles in said chamber, said wall means forming a header chamber between said bed of adsorption particles and said second port in said housing, said wall means dividing said chamber into an expansion chamber and a pressurizing chamber, said expansion chamber being connected to said third port and said pressurizing chamber being connected to said first port;
first valve means for allowing a fixed volume of said fluid mixture to flow through said first port during a first part of an operational cycle and for preventing fluid flow from the chamber during a second part of the operational cycle when said fluid mixture is presented to the bed of adsorption particles where a component is adsorbed and the product effluent communicated to said header chamber;
second valve means for preventing communication of any product effluent from said header chamber whenever the fluid pressure level in said chamber is below a predetermined value;
third valve means for allowing said product effluent to flow from the header chamber and purge said bed of adsorption particles of said component by flowing through said third port during said first part of the operational cycle and for preventing fluid flow through said third port during said second part of the operational cycle;
control valve means having a plunger extending through said housing and said wall means with a first face located in said pressurizing chamber and a second face located in said expansion chamber, said first face engaging said wall means during said second part of the operational cycle to prevent the flow of fluid mixture to the bed of adsorption particles, said second face engaging said wall means during said first part of the operational cycle to prevent communication from the bed of adsorption particles to the expansion chamber; and
a motor for providing said plunger with an operational input to reciprocate the wall means in said chamber and establish the first and second parts of the operational cycle.

28. The apparatus, as recited in claim 27 further including:
a ring gear attached to said wall means; and
an eccentric gear means attached to said housing and engageable with said ring gear, said motor means providing said plunger with rotative torque causing the ring gear to engage the eccentric gear and thereby move the wall means along a linear path in said chamber.

29. The apparatus, as recited in claim 27 further including:
plastic fibers mixed with the bed of adsorption particles to loosely hold the individual adsorption particles in a substantially fixed position adjacent said wall means, said plastic fibers absorbing impact forces transmitted to said individual particles of adsorption particles by the pressurized fluid mixture and product effluent and thereby prevent structural degradation thereof by frictional rubbing between the individual particles which constitute the bed.

30. An apparatus for separating a product effluent from a fluid mixture comprising:
a housing having a chamber therein with a first port, a second port and a third port, said first port being in communication with said fluid mixture, said second port being connected to a product effluent responsive device, and said third port being connected to a discharge conduit;
wall means for retaining a bed of adsorption particles in said chamber, said wall means forming a header chamber between said bed of adsorption particles and said second port in said housing, said wall means divides the chamber into an expansion chamber and a pressurizing chamber, said expansion chamber being connected to said third port and said pressurizing chamber being connected to said first port;
a flapper valve connected to said wall means and responsive to a positive pressure in said expansion chamber for preventing the communication of product effluent and the purged component from flowing into the control chamber.

31. The apparatus, as recited in claim 30 further including:
plastic fibers mixed with the bed of adsorption particles to loosely hold the individual adsorption particles in a substantially fixed position adjacent said wall means, said plastic fibers absorbing impact forces transmitted to said individual particles of adsorption particles by the pressurized fluid mixture and product effluent and thereby prevent structural degradation thereof by frictional rubbing between the individual particles which constitute the bed.

32. The apparatus as recited in claim 30 wherein said wall means further includes:
a control chamber for connecting said bed of adsorption particles with said pressurizing and expansion chambers.

33. The apparatus, as recited in claim 32 further including:
a shaft extending through said control chamber for connecting said first piston with said second piston, said shaft being connected to a motor means for providing the first and second pistons with reciprocal motion to establish said operational cycle; and
a spool located in said control chamber and carried by said shaft for engaging said wall means to prevent fluid flow into the expansion chamber during the first part of the operational cycle and into the pressurizing chamber during the second part of the operational cycle.

34. An apparatus for separating a product effluent from a fluid mixture comprising:
a housing having a bore therein with a first port, a second port and a third port, said first port being connected to a source of fluid mixture, said second port being connected to a product effluent storage device, said third port being connected to a discharge conduit;
piston means located in said housing for separating said bore into a pressurizing chamber and an expansion chamber, said piston having a separating chamber therein for retaining a bed of adsorption particles; and
motor means for reciprocating said piston means in said bore by rotating said piston in said bore to pressurize a fixed volume of the fluid mixture in the pressurizing chamber while expanding any fluid in said expansion chamber during the down stroke of the piston means, said pressurized fluid mixture from the pressurizing chamber being communicated to the separation chamber where a component in the fluid mixture is adsorbed in said bed of adsorption particles and the product effluent communicated to said second port during said down stroke, and said component being purged from said bed of adsorption particles by the product effluent flowing into the expansion chamber on the up stroke of the piston means while the fixed volume of the fluid mixture is drawn into said pressurizing chamber to complete a cycle of operation.

* * * * *